United States Patent [19]

Matsuzaki et al.

[11] Patent Number: 5,030,981
[45] Date of Patent: * Jul. 9, 1991

[54] AUTOMATIC FOCUSING CAMERA

[75] Inventors: Minoru Matsuzaki; Junichi Itoh, both of Hachioji; Youji Watanabe, Sagamihara, all of Japan

[73] Assignee: Olympus Optical Co., Ltd., Japan

[*] Notice: The portion of the term of this patent subsequent to Oct. 10, 2006 has been disclaimed.

[21] Appl. No.: 364,656

[22] Filed: Jun. 12, 1989

Related U.S. Application Data

[63] Continuation of Ser. No. 106,574, Oct. 8, 1987, Pat. No. 4,873,543.

[30] Foreign Application Priority Data

Nov. 1, 1986 [JP] Japan ............................... 61-261692

[51] Int. Cl.⁵ ..................... G03B 13/36; G02B 7/28
[52] U.S. Cl. ............................... 354/402; 250/201.2
[58] Field of Search ............... 354/400, 402-409; 250/201, 201 PF, 201 AF, 204, 201.2, 201.8, 201.4, 201.6, 201.7

[56] References Cited

U.S. PATENT DOCUMENTS 4,508,443 4/1985 Matsuzaki et al. ................. 354/402
4,537,487 8/1985 Taniguchi et al. ................. 354/400
4,671,640 6/1987 Akada et al. ....................... 354/402
4,743,931 5/1988 Matsuzaki et al. ................. 354/400

Primary Examiner—W. B. Perkey
Attorney, Agent, or Firm—Louis Weinstein

[57] ABSTRACT

An automatic focusing camera includes a sensor for detecting an amount and a direction of difference between an image forming position of light from an object being photographed and a film surface to drive a taking lens in response to the measured outputs and focus determining capability which gives a decision of in-focus when the amount of difference is less than a first automatic focusing threshold. A focusing operation is achieved such that, comparing the amount of difference determined by the sensor with a second automatic focusing threshold of a standard value which is larger than the first automatic focusing threshold, when the amount is less than the second threshold and a direction of difference last measured and that presently measured are the same, a taking lens driving is continued to complete a focusing operation and when the directions are different from each other, the measurement is resumed after the next driving of the taking lens even when the amount is less than the second threshold.

13 Claims, 9 Drawing Sheets

AUTOMATIC FOCUSING CAMERA

This is a continuation of application Ser. No. 106,574, filed Oct. 8, 1987 U.S. Pat. No. 4,873,543.

BACKGROUND OF THE INVENTION

The present invention relates to an automatic focusing camera, and more particularly, to an automatic focusing camera provided with an automatic focus detecting device which includes measuring means for detecting an amount and direction of difference between an image forming position and a film surface and drives a taking lens to its focal point in response to an output of the measuring means.

In the past, an automatic focusing (hereinafter referred to as AF) system has been disclosed as an automatic focus detecting device for a camera in U.S. Pat. No. 4,508,443 of common assignment. This system includes an AF detector provided within a lens barrel for automating a focusing operation. With this arrangement, an AF control is achieved by an open-loop control when an amount of defocus is less than a threshold. Specifically, a taking lens is driven in the routine of <MDRIV8> shown in FIG. 22 of U.S. Pat. No. 4,508,443 to bring it into focus. In this case, since an address signal is produced by turning on and off an address switch on a lens range ring, the play in a lens drive system is practically negligible. However, the problem is only a play between the lens range ring and a lens focusing group. Such play is less than 1/100 mm calculated on a focus plane, so that it is negligible as to accuracy in AF. Consequently, in the routine <MDRIV8>, it is possible to obtain exact focusing accuracy without determining AF calculated values such as a CCD integration again by operating AF elements.

The AF system, however, which includes an automatic focus detection device within a lens barrel, requires as many devices as there are interchangeable lenses and lenses thus become bulky and expensive. Accordingly, these disadvantages can be eliminated when the AF system applies to a camera of the lens interchangeable type in which a drive source such as a motor is provided on a camera body and a driving force transmitting system and a lens driving mechanism are provided on an interchangeable lens barrel and these arrangements are connected by a coupler through a camera mount.

In this case, however, an integrated value in play occuring in the coupler and the like is nearly 1/100~15/100 mm calculated on the focus plane which is not negligible in accuracy of AF.

SUMMARY OF THE INVENTION

It is an object of the present invention to provide an automatic focusing camera within which a high accuracy of AF can be obtained by reducing play in a lens driving step system to a minimum without deteriorating operational capability such as an AF speed.

According to the present invention, as shown in FIG. 1, an AF camera with an automatic focus detecting device which includes range measuring means 1 for detecting an amount and direction of difference between an image forming position of light from an object being photographed and a film surface and determines an in-focus condition by means 2 for determining focusing when an amount of difference is less than a given value (hereinafter referred to as a first AF threshold) by driving a taking lens in response to an output of the range measuring means 1, is characterized by means 3 for detecting the neighborhood of focus for comparing an amount of difference with a standard value (hereinafter referred to as a second threshold) which is larger than the first threshold, means 4 for determining a direction of difference for comparing a direction of difference last measured with that presently measured and means 5 for adjusting focusing which terminates the focusing operation after continuation of the lens driving operation as long as an amount of difference in the neighborhood detecting means 3 is within the standard value and both the direction of difference in the last and present measurements by the direction determining means 4 are the same and which resumes the range measurement after the next lens driving step as long as the directions of difference are different from each other even when an amount of difference is within the standard value.

In other words, according to the present invention, when a play in a lens driving system is more than 1/100 mm calculated on a focus plane and this is to be considered in AF accuracy, an open-loop control is achieved in an AF driving operation at the neighborhood of focus when a present driving direction of a lens is the same as the last driving direction, namely, the lens driving is continued without resuming the range measurement, thereby judging to be in focus, and when a present lens driving direction is different from the last one, an in-focus condition is determined after the range measurement is resumed since an AF accuracy is deteriorated by putting play in the lens driving system aside to the opposite side.

According to the present invention, since a decision is made with the second AF threshold as to whether an open-loop control is started or a closed-loop control is continued, it is possible to achieve a highly accurate focusing operation without deteriorating an operational capability such as a focusing speed even when a lens driving system has some play. In addition, this effect is achievable merely by adding some software.

DESCRIPTION OF THE PREFERRED EMBODIMENT

The present invention will be described with reference to an embodiment of a camera of an interchangeable lens type having an AF function.

Figure 1:
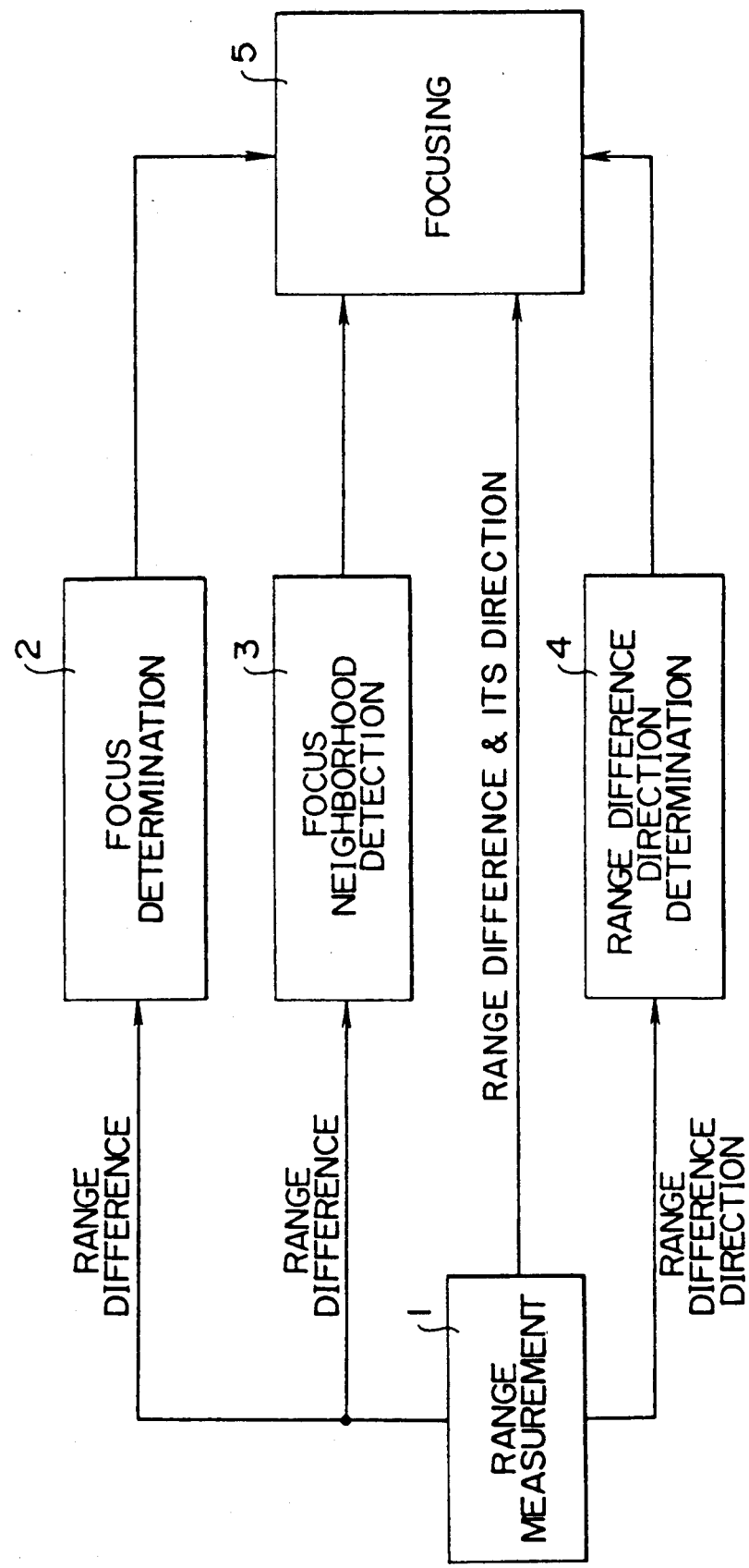
FIG. 1 is a schematic diagram showing a general concept of the present invention.
Figure 2:
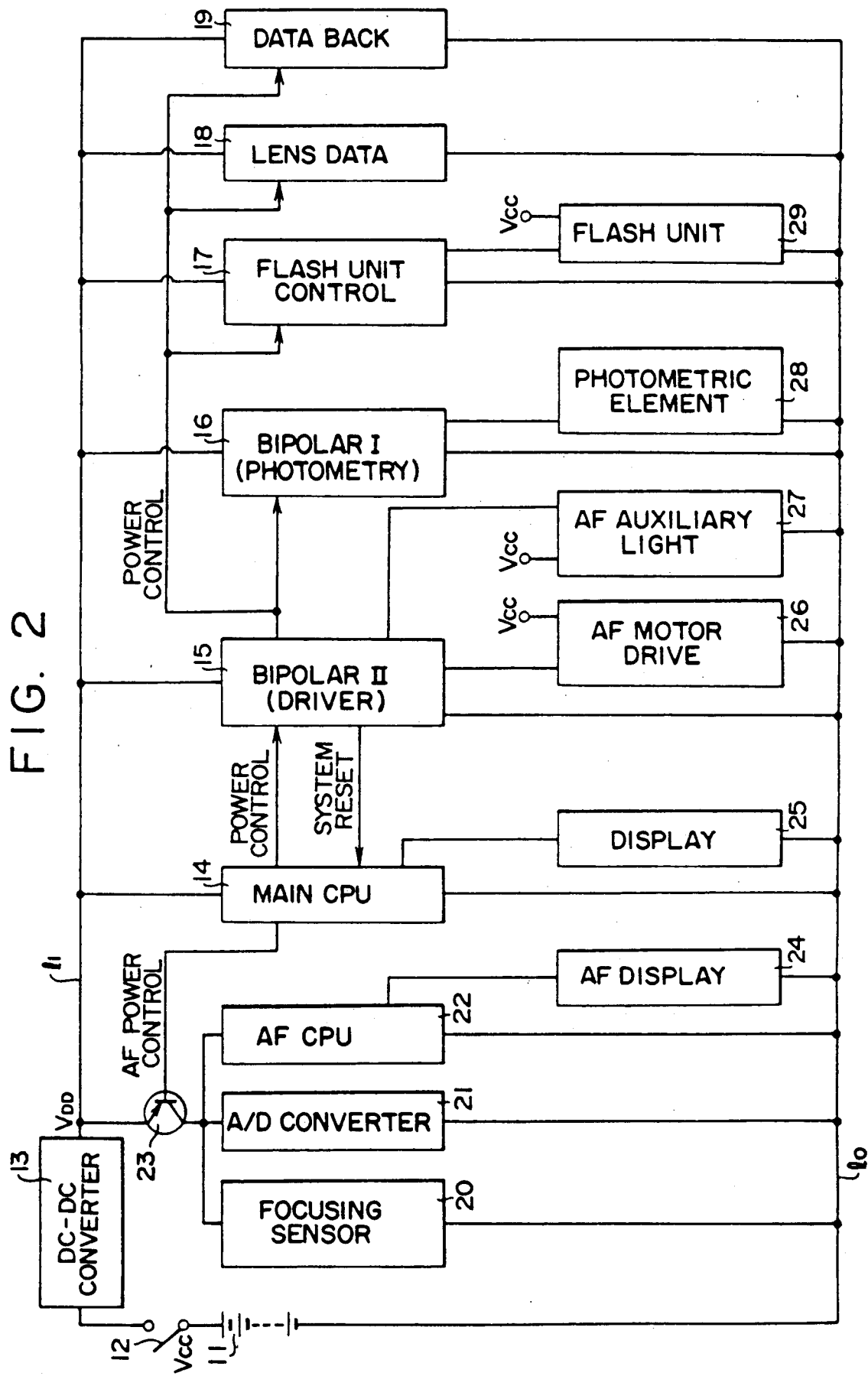
FIG. 2 is a block diagram of an electrical circuit showing the relationship of power supplies in a camera system to which the present invention is applied.

In FIG. 2, a voltage $V_{CC}$ of a power supply battery 11 is boosted by a DC/DC converter 13 when a power switch 12 is closed and a constant voltage $V_{DD}$ is applied between lines $l_0$ and $l_1$. Between lines $l_0$ and $l_1$ are connected to a main CPU 14, a bipolar II circuit 15, a bipolar I circuit 16, an electronic flash unit control circuit 17, a lens data circuit 18 and a data back circuit 19. Power supply control of the bipolar II circuit 15 is effected by a signal from a power control circuit of the main CPU. Power supply controls of the bipolar I circuit 16 through the data back circuit 19 are effected by a power control signal from the bipolar II circuit 15.

An AF block composed of a focusing sensor 20, an A/D converter 21 and a CPU 22 for AF is connected through a transistor 23 for power control between the lines $l_0$ and $l_1$. Power supply control of the AF block is effected by turning the transistor 23 on and off with a signal from a power control circuit for AF of the main CPU 14. The CPU 22 for AF, which is a circuit for effecting an algorithmic operation for AF, is connected to a display circuit for AF 24 which displays in- and out-of-focus conditions. The main CPU 14, which is a circuit for controlling the whole sequence of a camera such as film winding, rewinding and exposure sequence, is connected to a display circuit 25 which displays conditions other than the in- and out-of-focus conditions. The bipolar II circuit 15, which is a circuit including various drivers necessary for camera sequence such as motor control for film winding and rewinding, lens driving and shutter control, is connected to an AF motor driving circuit 26 and an AF auxiliary light circuit 27. The bipolar I circuit 16 is a circuit for mainly effecting photometry and includes a photometry element 28. The flash unit control circuit 17 controls flashlight emission of an electronic flash unit 29 which is built in or externally mounted on a camera. The lens data circuit 18 stores lens data peculiar to individual interchangeable lenses and necessary for camera control such as AF and photometry. The lens data circuit 18 is provided to each interchangeable lens and is electrically connected through a mount to a circuit within a camera when mounting on the camera. Incidentally, in compact cameras and the like, the lens data circuit 18 is built in a camera body. Data required for AF of lens data stored in the lens data circuit 18 are a lens variable power coefficient (zoom coefficient), a macro identification signal, absolute range factors a, b, an AF accuracy threshold ETh, a direction of lens movement, an F value at an open aperture and the like.

The bipolar II circuit 15 detects a state of power supply voltage $V_{DD}$ to deliver a system reset signal, when the voltage $V_{DD}$ drops below a given voltage, to the CPU 14 to interrupt power to the bipolar II circuit 15 through the data back circuit 19 as well as the AF block. Power supply to the main CPU 14 is continued even under the given voltage.

Figure 3:
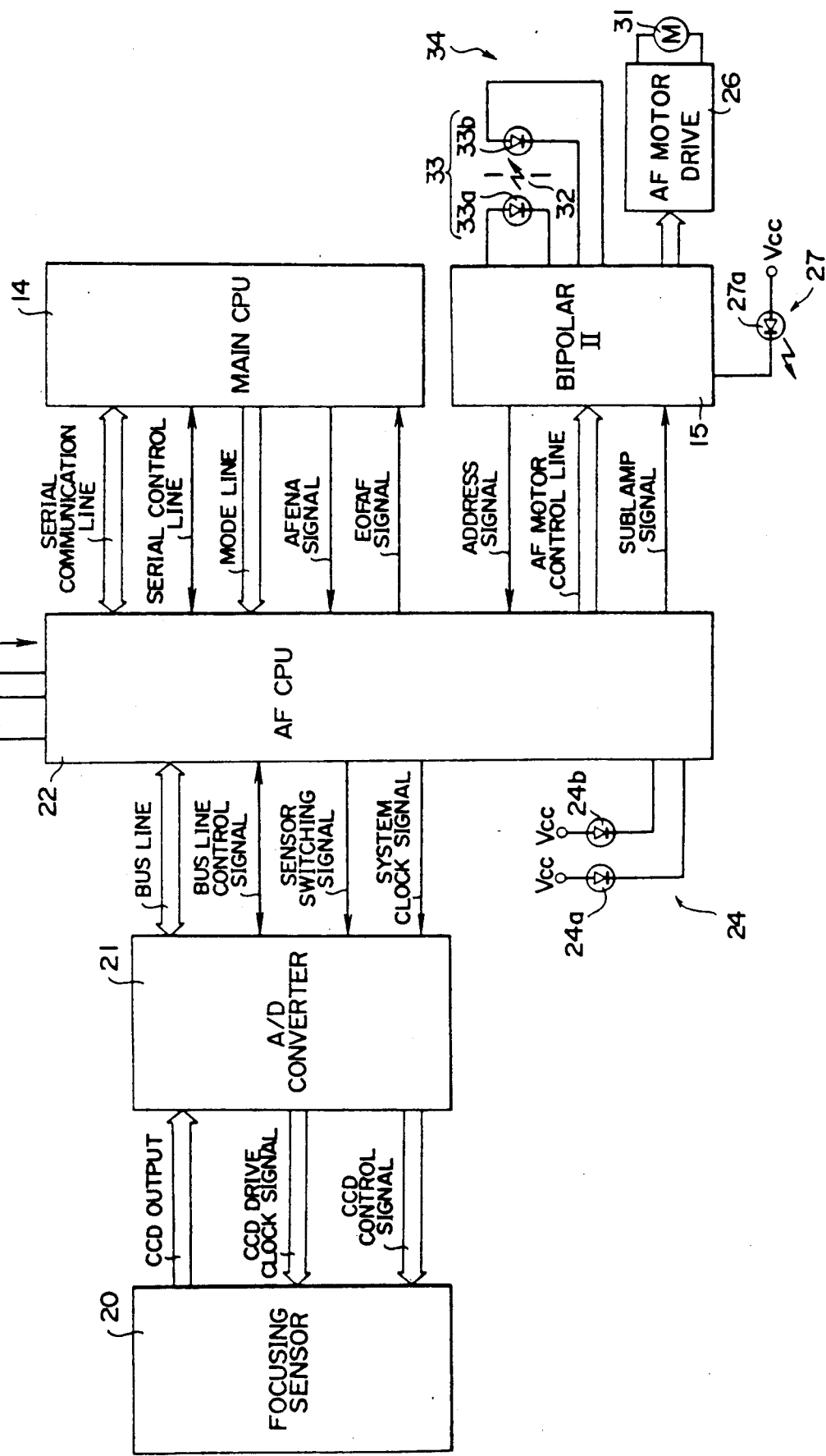
FIG. 3 is a system block diagram showing transfer of signals in an AF block shown in FIG. 2.

In FIG. 3, the CPU 22 for AF and the main CPU 14 give and receive signals therebetween on a serial communication line and their communication direction is controlled by a serial control line. Contents of the communication are specific lens data stored within the lens data circuit 18 and absolute range information. In addition, information of camera modes (AF single mode/AF sequence mode/other modes) is decoded from the main CPU 14 through a mode line to the AF CPU 22. An AFENA (AF enable) signal from the main CPU 14 to the AF CPU 22 is provided to start and stop an AF operation. An EOFAF (end of AF) from the AF CPU 22 to the main CPU 14 is generated at the end of an AF operation to allow shift to an exposure sequence mode.

The bipolar II circuit 15 decodes a signal of AF motor control line from the AF CPU 22 to drive the AF motor drive circuit 26. When an AF motor 31 (lens drive motor) rotates by an output from the motor drive circuit 26, slits 32 equidistantly spaced on a rotary member of a lens barrel rotate and a photo-interrupter 33 comprising a light source 33a and a photosensitive member 33b which are arranged facing each other with a passage of slits 32 between counts the number of slits 32. Thus, the slits 32 and the photo-interrupter 33 constitutes an address generator 34 and an address signal (a count signal of the slits 32) from the address generator 34 is shaped in wave form and is introduced into the AF CPU 22.

A sublamp (hereinafter referred to as S lamp) signal from the AF CPU 22 to the bipolar II circuit 15 controls an AF auxiliary light circuit 27 to light an S lamp 27a when an object being photographed is in a low light (low brightness) LL.

The AF display circuit 24 connected to the AF CPU 22 has an LED (light emitting diode) 24a for focusing OK display and an LED 24b for focusing unable display. An oscillator 35 for clock pulses and a capacitor 36 for reset are connected to the AF CPU 22.

The AF CPU 22 and the A/D converter 21 transfer data through a bus line therebetween and the direction of their transmission is controlled by a bus line control signal. In addition, a sensor changeover signal and a system clock signal are sent from the AF CPU 22 to the A/D converter 21. The A/D converter 21 delivers a CCD drive clock signal and a CCD control signal to the focusing sensor 20 which is made up of, for example, a CCD (charge coupled device) and reads out a CCD output from the focusing sensor 20 and then sends the analog CCD output to the AF CPU 22 after A/D conversion.

With the above arrangement of an automatic focusing camera of the present invention, program operations of a microcomputer around the AF block will be described hereinafter.

Figure 4:
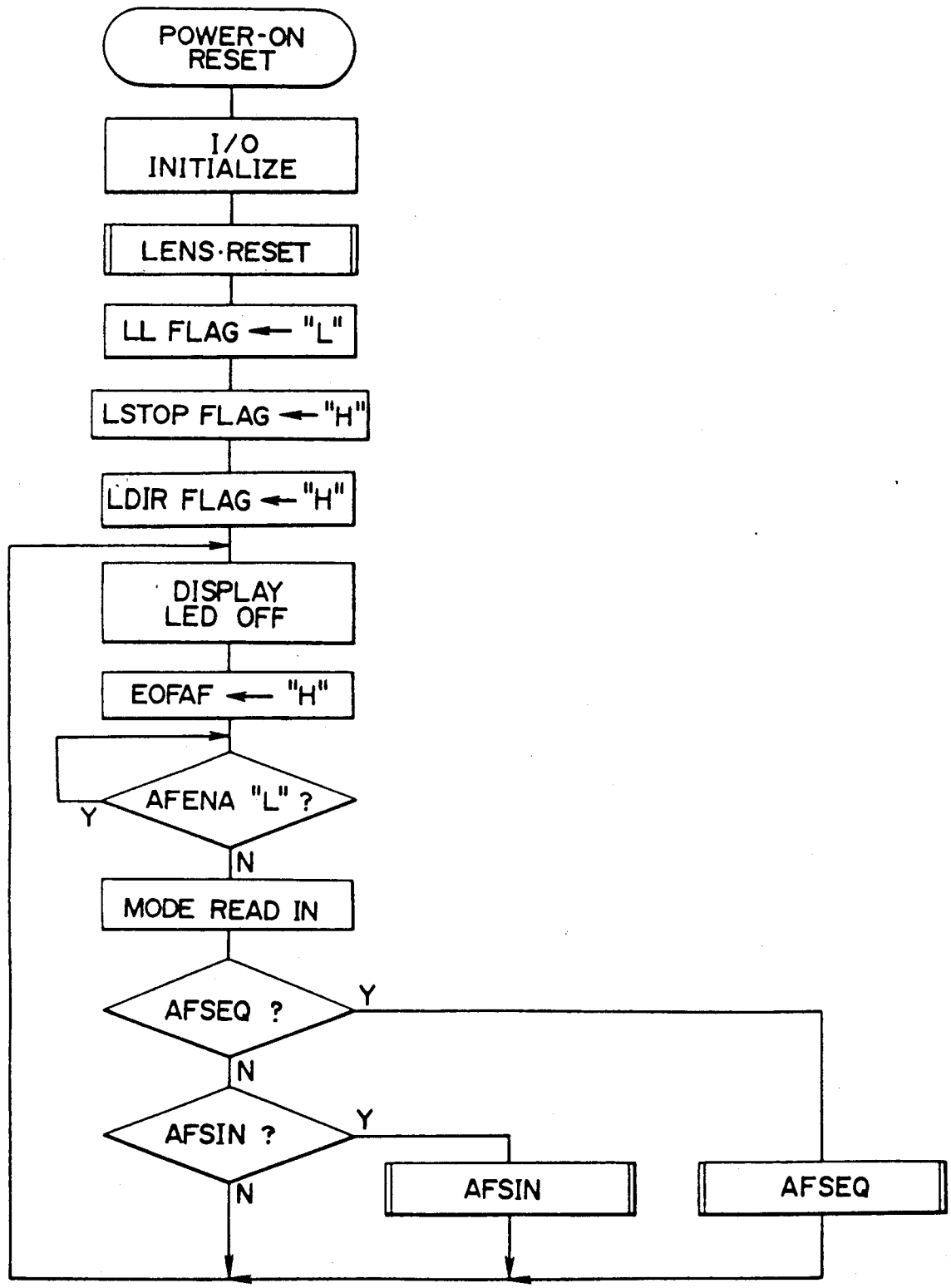
FIGS. 4 through 9 are flow charts showing program operations of a CPU for AF shown in FIG. 3.

The AF block, as shown in FIG. 2, is supplied with a voltage $V_{DD}$ by turning the transistor 23 on by energizing the AF power control circuit of the main CPU 14 and thereby initiates a power-on.reset routine shown in FIG. 4.

When the power-on.reset routine is initiated, as shown in FIG. 4 a drive circuit of the AF block is initialized in a subroutine <I/O initialize>. Specifically, the AF display circuit 24, AF motor drive circuit 26 and AF auxiliary light circuit 27 are turned off and the serial communication lines between these circuits and the main CPU 14 are initialized.

Subsequently, a lens reset operation is initiated such that a lens is forcibly moved to an infinity position and thereby an initializing operation, that is, a clearing operation of an absolute range counter is effected in order to convert a relative range signal which is a measured range output signal from the focusing sensor 20 into an absolute range signal by rearranging the measured output signal to the number of pulses movement starting from the infinity position.

After the lens reset operation, a low light flag (hereinafter referred to as LL flag) is set to a low level "L" and an LSTOP flag and an LDIR flag are set to a high level "H". The LSTOP flag is at "H" when a range ring of a lens is at infinity and at "L" when it is at close range. The LDIR flag, which sets a direction of lens movement, is at "H" in a direction to infinity and at "L" in a direction to close range. The LED display is then turned off and the EOFAF is set at "H".

Next, the AF CPU 22 awaits an AFENA signal from the main CPU 14 to turn "H". The main CPU 14 awaits an operator to operate a first stage of a release button after a photographing mode which has been set by the operator is delivered to the mode line. Immediately after the AFENA signal turns from "L" to "H", the AF CPU 22 reads status of the mode line and selects either a subroutine <AF single (AFSIN)> or <AF sequence (AFSEQ)> to initiate it.

An operation of the mode <AFSIN>, which is a one-shot AF operation, is to focus-lock after an AF operation of an object being photographed. An operation of the mode <AFSEQ>, which is a continuous AF operation, is to continue an AF operation as long as a first stage of a release button is being operated.

Next, an operation of a lens drive mode will be described with reference to FIGS. 5 through 9.

Figure 5:
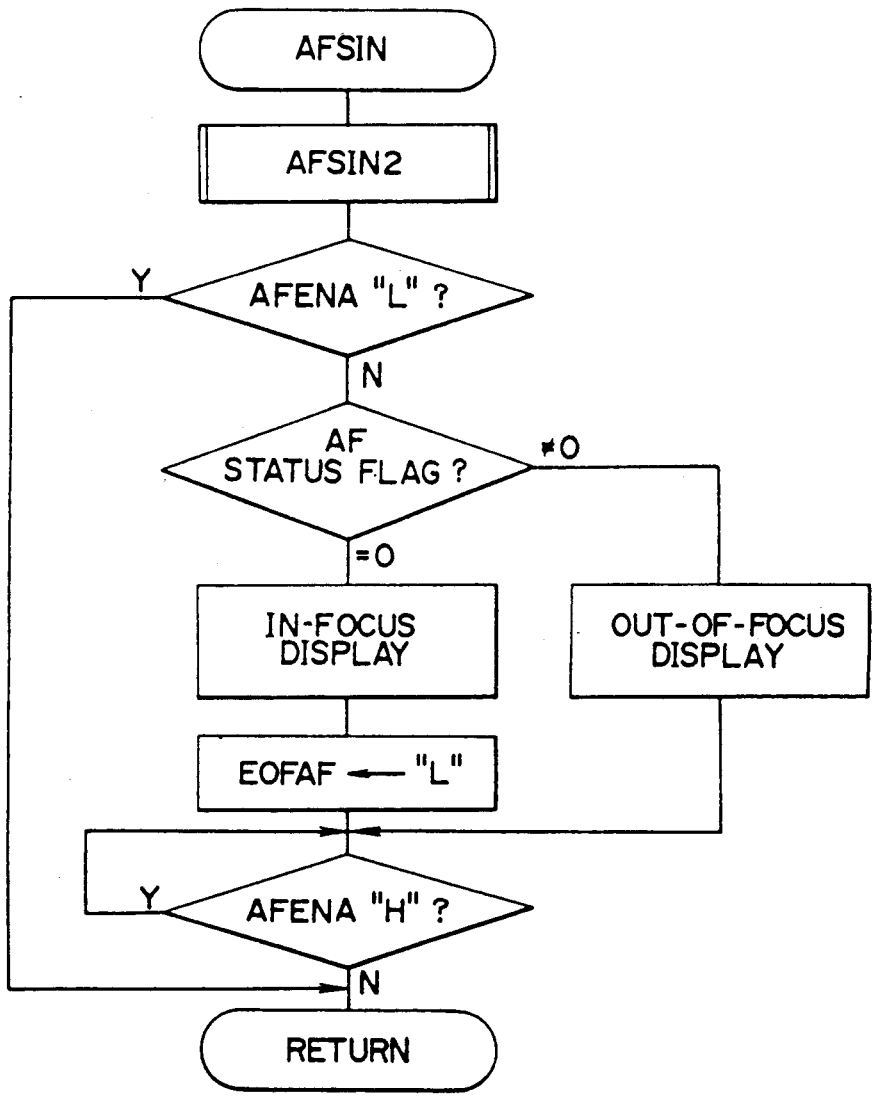

When the mode <AFSIN> is selected, the routine shown in FIG. 5 is carried out and a subroutine <AFSIN2> is called. At this time, a second stage operation of a release button is not allowed until an exposure sequence is initiated after an in-focus condition has been achieved upon completion of an AF operation. In the mode <AFSIN2>, as will be described hereinafter, a CCD integration of the focusing sensor 20, calculation of a measured range output and driving of a lens are effected. As a result of the AF operation in the mode <AFSIN2>, in- and out-of-focus displays are effected detecting an AF status flag after the operation of <AFSIN2>. The AF status flag includes a low contrast flag (LC flag) which is set at "1" when an object being photographed is in a low contrast, a move flag (M flag) which is set at "1" when an object being photographed is in movement, a nearest range flag (N flag) which is set at "1" when a lens is going to move over a nearest range, and an over flag (OV flag) which is set at "1" when an in-focus condition is not obtained even after a lens has been repeatedly driven, for example, eight times. When all these flags are "0", a focusing is possible and when any one of these flags is "1", a focusing is impossible. Accordingly, observing the AF status flag, when it is "0", focusing OK is displayed with the LED 24a of the AF display circuit 24 and when it is not "0", focusing impossible is displayed with the LED 24b. When in focus, an EOFAF signal is delivered and the AF operation is completed, thereupon the main CPU 14 awaits a second stage operation of a release button, that is, a condition ready for initiating an exposure sequence. After focusing has been completed, the subsequent lens operation is prohibited even when an AFENA signal is active and the LED 24a displaying focusing OK is retained on, resulting in a focus-lock condition. When an AFENA signal from the main CPU 14 is at "L" level (inactive), the flow is returned to a test of an AFENA signal in the flow diagram of power-on.reset shown in FIG. 4.

Figure 6:
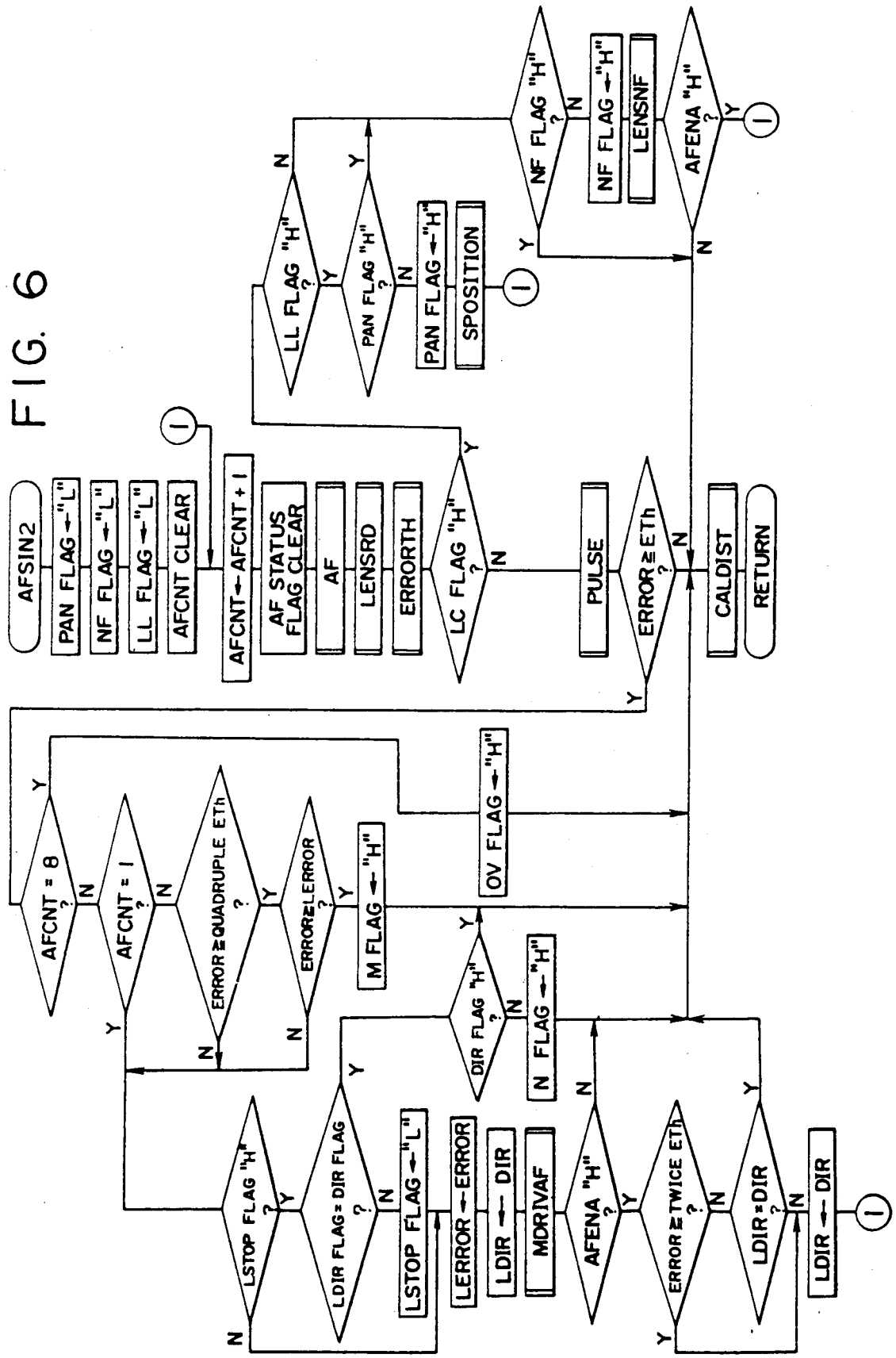
Figure 7:
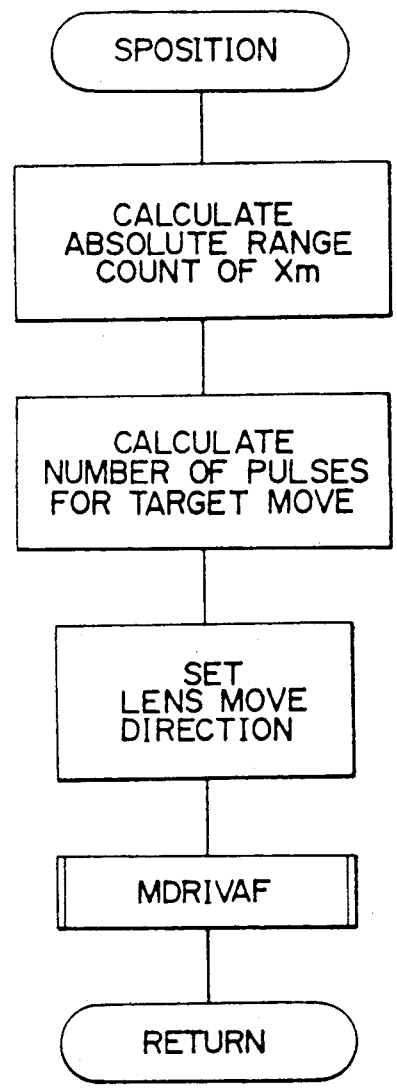

During operation of the mode <AFSIN>, program operation of the subroutine <AFSIN2> are carried out as shown in FIG. 6.

First, a PAN flag, an NF flag (both flags will be described later) and the LL flag for controlling the AF operation are cleared and then a counter AFCNT for counting the number of AF operations is cleared.

Subsequently, adding 1 to the AFCNT, the first AF operation starts. First, all of the AF status flags are cleared and an autofocus routine <AF> for measuring a range is called. In the routine <AF>, a range to an object being photographed is measured, an AF calculation output (ERROR) is calculated and a direction in which a lens is to be moved is set into a DIR flag ("H" in a direction to infinity and "L" in a direction to a close range). At this time, when the object is in low brightness during the range measurement, the LL flag is set to "H" and the range measurement is carried out with the S lamp 27a lighted. In addition, when the object is in low contrast, an LC flag is set to "H".

Thereafter, a lens read routine <LENSRD> is called to read in data of an individual lens stored in the lens data circuit 18. An AF accuracy threshold (ETh) is determined in a subroutine <ERRORTH> by using information regarding a lens open aperture F No. among the lens data in the lens data circuit 18. Then, judging the LC flag, when the object is not in low contrast, the LC flag is retained cleared and at level "L", so that a pulse routine <PULSE> is called to calculate an amount of lens movement. Specifically, in the routine <PULSE>, in order to convert the AF calculated range output determined by the <AF> operation to an amount of lens movement for individual interchangeable lens, information such as a variable power coefficient is read from the lens data circuit 18 and the number of pulses (address signal) corresponding to the amount of lens movement to a focus is calculated with the variable power coefficient and the AF calculated range output.

After that, in a first AF threshold which compares the AF calculated range output (ERROR) with the AF accuracy threshold (ETh), when the former (ERROR) is less than the latter (ETh), operation proceeds to a routine <CALDIST> judging in-focus. When not, operation proceeds to AFCNT check. When a value of AFCNT is 8, this indicates that the AF operations have been already effected eight times, so that an OV flag is set to "H" to proceed to <CALDIST>, considering that focusing would be impossible even if the AF operation is further continued. When not eight, the AFCNT is checked whether it is 1 or not. When the value is 1, operation proceeds to LSTOP flag check. When the LSTOP flag is at "H", it indicates that a lens has been already at its terminal end. Accordingly, comparing and LDIR flag indicating a direction of the lens at the terminal end with a DIR flag indicating a direction of the lens to be further moved, when both directions are the same, operation proceeds to DIR flag check. When the DIR flag is "H", since a direction of the lens movement indicates a farther infinity side than the lens infinity end, operation proceeds to <CALDIST> considering that this condition is in-focus. On the other hand, when the DIR flag is "L", the object is nearer than the lens close end and considering that this condition is out-of-focus operation proceeds to <CALDIST> after turning an N flag to "H". When both directions are not the same, an LSTOP is cleared, and then the AF calculated range output (ERROR) is transferred to a register for storing the last ERROR (LERROR) and the DIR flag indicating a direction of movement is also transferred to the LDIR flag indicating a direction to the lens terminal end.

Returning back, even when the LSTOP flag is not "H", operation proceeds to set the LERROR and LDIR flags. Subsequently, a routine <MDRIVAF> is called to move a lens by an amount corresponding to the number of pulses calculated in the routine <PULSE> in a direction indicated by the DIR flag. When the lens reaches its end during its movement, a power supply to the lens drive motor 21 is interrupted and operation proceeds to RETURN by turning the LSTOP flag to "H". In addition, while the routine <MDRIVAF> is in operation, an AFENA signal is checked any time. Accordingly, when an operator interrupts the first step operation of a release button during the lens driving, the main CPU 14 turns an AFENA signal from "H" to "L", so that when the AF CPU 22 detects the level "L" of the AFENA signal, the lens driving is immediately interrupted and operation proceeds to RETURN.

When operation returns from the routine <MDRIVAF> to RETURN, an AFENA signal is first checked and when it is "L" operation proceeds to <CALDIST>. When the AFENA signal is "H", operation checks whether the AF calculated range output (ERROR) obtained in the routine <AF> is more than two times as much as the AF accuracy threshold (ETh), a reference value (a second AF threshold), obtained in the routine <ERRORTH>. When the output (ERROR) is more than two times as much as the AF accuracy threshold (ETh), the present DIR flag is loaded to the LDIR flag and operation returns to ① to initiate the second AF operation. When the output (ERROR) is less than two times as much as the AF accuracy threshold (ETh), the last drive direction flag LDIR is compared with the present drive direction flag DIR, when both directions are not the same, the present DIR flag is loaded to the LDIR flag and operation proceeds to ① to initiate the second AF operations. When the output (ERROR) is less than two times as much as the AF accuracy threshold (ETh) and the last drive direction flag agrees with the present drive direction, that is, LDIR=DIR, operation proceeds to the routine <CALDIST>.

In other words, when the output (ERROR) is less than the second AF threshold and the drive direction flag (DIR) is the same as the last one, the presently determined AF calculate range output (ERROR) is final and thereafter a lens is driven based on the final value to complete the AF operation.

Namely, the subsequent operation is carried out with an open-loop control without a feedback. Such an open-loop control is enabled by the fact that (i) since the lens is continuously driven in the same direction, a play in the lens drive system is set aside to one direction and in the final AF operation the lens is driven in the same direction, so that play can be cancelled, and (ii) in the neighborhood of focus, the correlation between the AF calculated range output and an amount of defocus on the focal plane is excellent in reproducibility and the AF calculated value is high in reliability. Thus, since it is possible to obtain a desired focusing accuracy without using a closed loop control, after this step an improvement in focusing speed is made with the rapid AF focusing operation using the open-loop control.

When the AF output (ERROR) is less than the standard value but the present direction of lens driving is different from the last one, since the play in the present lens driving is set aside to the opposite side of the last lens driving direction, this causes deterioration in AF capability. In such case, as previously described, a desired focusing accuracy is maintained by ensuring the AF capability with a closed-loop control in which the present lens driving direction flag DIR is loaded to LDIR flag to return to ① and resume AF operations. Even in these operations, (i) when the LDIR agrees with the DIR and the Af calculated range output (ERROR) is less than the standard value, operation is shifted to an open-loop control, (ii) when a play in the lens driving system is reduced and ERROR < the first threshold ETh, a decision is immediately made that this is in-focus and operation proceeds to the routine <CALDIST>.

Although AF operations on and after the second are similar to the first one, since AFCNT≠1 in a decision of whether AFCNT is 1 or not, whether the AF calculated range output (ERROR) is more than four times as large as the AF accuracy threshold (ETh) or not is examined. If not, operation proceeds to LSTOP flag check in a manner similar to the first AF operation. If so, comparing the present AF calculated range output (ERROR) with the last one (LERROR), when not ERROR≧LERROR, operation proceeds to LSTOP check in a manner similar to the first AF operation and when ERROR≧LERROR, an M flag is set to "H" and operation proceeds to <CALDIST>. This is based on a judgment that the fact that the AF calculated range output is larger than the previous value in a larger scope of an amount of defocus than four times as many as the AF accuracy threshold indicates that an object being photographed moves at a high speed, so that there is no use in doing further AF operations.

The case where the LC flag is set to "H" in the routine <AF> because an object being photographed is in low contrast, will be described hereinafter. The routines <LENSRD> and <ERRORTH> are effected in a manner similar to the foregoing. In judgment of the LC flag, when the LC flag is "H", operation proceeds to LL flag judgment. When the object is not in a low brightness and the LL flag is "L", operation proceeds to <LENSNF>. When the object is in low brightness and the LL flag is "H" (the auxiliary illuminating light S lamp 27a is used), operation goes to a PAN flag judgment which is a flag for control. The PAN flag is cleared in the first place of the routine <AFSIN2> and is set to "H" immediately before a routine <SPOSITION>. When the PAN flag is not "H", it is made "H" and subsequently the routine <SPOSITION> is called, which will be described with reference to FIG. 7.

The routine <SPOSITION> is operated such that when the auxiliary lamp S 27a is used a taking lens is allowed to move to a position where a range measurement is effectively feasible. Now, let it be supposed that the position is X m in its absolute range. First, using absolute range coefficients a and b which have been stored in the routine <LENSRD>, a value in an absolute range counter at the position of X m is calculated. Next, comparing the calculated value with a value in the absolute range counter at a position where a taking lens is stopping, the number of pulses where the object moves from the present position and a direction of lens movement are calculated. Subsequently, the lens is moved to the effective range measurement position with the auxiliary lamp light in a routine <MDRIVAF> and operation proceeds to RETURN.

After having returned, operation proceeds to ① to initiate the second AF operation.

When an object being photographed is in low contrast even at the position of X m, operation goes to the LL flag check and the PAN flag check in a manner similar to the first AF operation. At this time, since the PAN flag has already been set to "H", the next operation goes to an NF flag check. The NF flag check, which is a control flag for effecting a routine <LENSNF> only one time, is cleared in the first place of the routine <AFSIN2> and set immediately before the routine <LENSNF>. When the NF flag is not "H", it is then made "H" and subsequently a routine <LENSNF> is called. The routine <LENSNF> allows a taking lens to be driven out once to a close range position and then to be driven in to an infinity position, thereby positively informing an operator of the inability to focus by a sharp increase in lens movement. During the lens movement, however, a judgment on whether the object is in low contrast is always effected and when the object is not in low contrast, the lens movement is immediately interrupted and operation goes to RETURN. In addition, when an AFENA signal turns from "H" to "L", the lens movement is also interrupted and operation goes to RETURN. When the lens reaches its infinity end to stop, the absolute range counter, which saves the number of lens movement address signal from the infinity position of a lens range ring, is reset and the LSTOP flag is set to "H".

After the routine <LENSNF>, and AFENA signal is checked. When the signal is not "H", operation goes to <CALDIST> and when "H", operation returns again to ① to initiate the normal AF operation. At this time, however, when an object being photographed is again in low contrast, operation goes through the LL flag check and the PAN flag check to the NF flag check. However, the NF flag has already been set to "H", so that operation goes to <CALDIST> without resuming the routine <LENSNF>.

The routine <CALDIST> is to calculate an absolute range to an object being photographed from a value of the absolute range counter for counting the number of drive pulses from an infinity position of a lens range ring and an absolute range coefficient within the lens data circuit 18. The calculated absolute range is delivered to the main CPU 14.

Now, the routine <AFSIN2> is completed and operation returns to the routine <AFSIN>.

Figure 8:
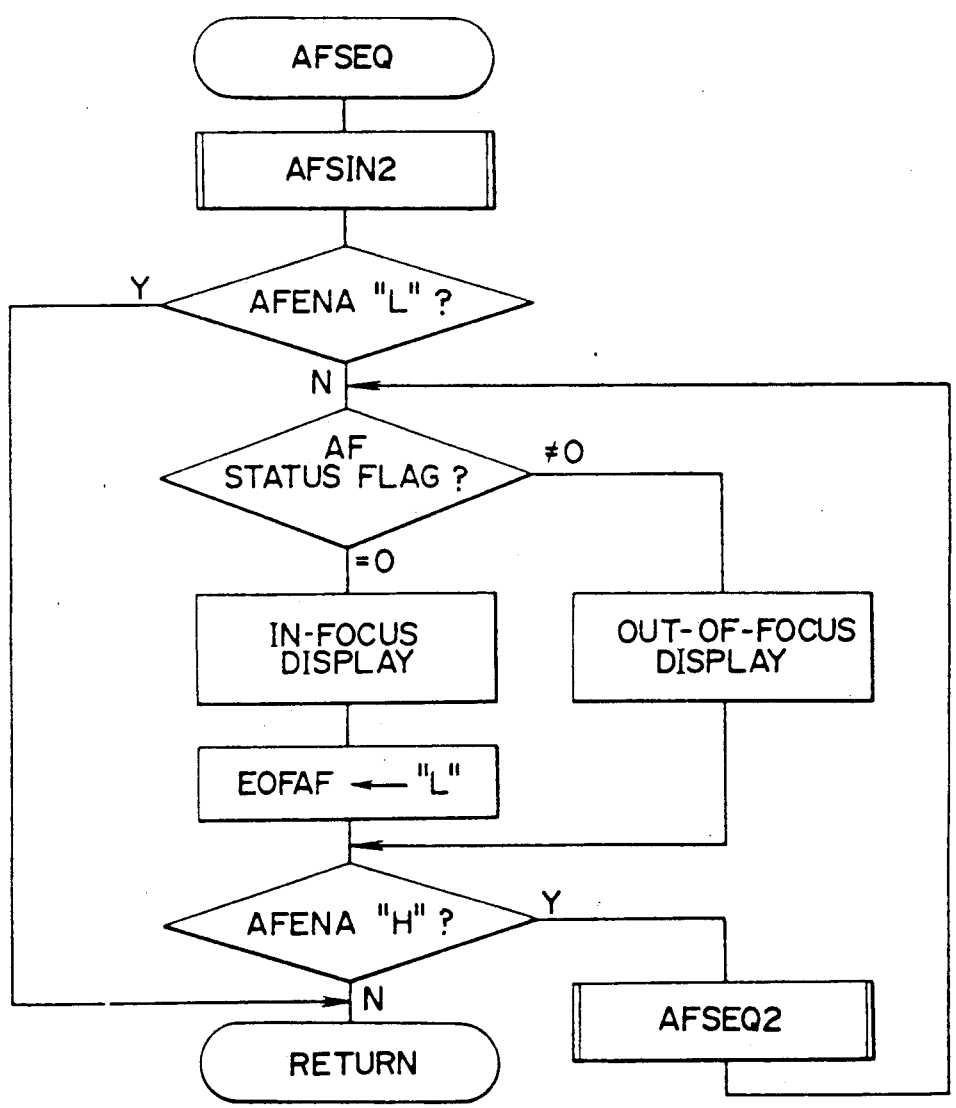

In the flow diagram shown in FIG. 4, when the mode <AFSEQ> is selected, a routine <AFSEQ> shown in FIG. 8 is called. In the routine <AFSEQ>, after a first stage of a release button is operated a first AF operation until an EOFAF signal becomes active is effected in a manner quite similar to the foregoing routine <AFSIN>. Specifically, in both the routines <AFSIN> and <AFSEQ>, the routine <AFSIN2> is effected and when focusing is impossible, this is positively informed to an operator by extraordinarily driving a taking lens.

In the routine <AFSIN2>, as described above, when an object being photographed is in low brightness, the range measurement for the AF operation is assisted by using the S lamp 27a. In the mode <AFSEQ>, if the S lamp 27a is employed similarly while the AF operation is continuously effected, the lamp would remain continuously lighted during the CCD integration in the routine <AF>, resulting in that current consumption is increased and efficiency is reduced due to heat generation of the S lamp. In addition, when focusing is not possible, a taking lens is continuously and extraordinarily driven to give a feeling of uneasiness to an operator.

In the routine <AFSEQ>, accordingly, after an EOFAF signal is set by effecting the AF operation one time, judging the AFENA signal, when it is active, a first stage operation of a release button is continued and a routine <AFSEQ2> is called and when it is nonactive the first stage operation of the release button is off or assuming that a second stage operation of the release button has been effected, operation goes to RETURN. In the routine <AFSEQ2>, as will be described hereinafter, while the CCD integration of the focusing sensor 20, the AF calculation and the lens driving are effected, the positive focus unable display due to extraordinarily driving of a taking lens and lighting of the S lamp 27a for measuring a range are not effected. As a result of operations of the routine <AFSEQ2>, an AF status flag is judged. When the AF status flag is 0, focusing OK is displayed and when not 0, a focusing unable display is set. After the display of focusing OK, an EOFAF signal is produced and an exposure sequence is initiated by the second stage operation of the release button. After the EOFAF signal is produced or a focusing unable display is made, since an AFENA signal is again tested, the AF operations around the routine <AFSEQ2> is continued as long as the first stage operation of the release button is retained on. When an AFENA signal becomes nonactive, operation returns to the power-on.reset flow shown in FIG. 4.

Figure 9:
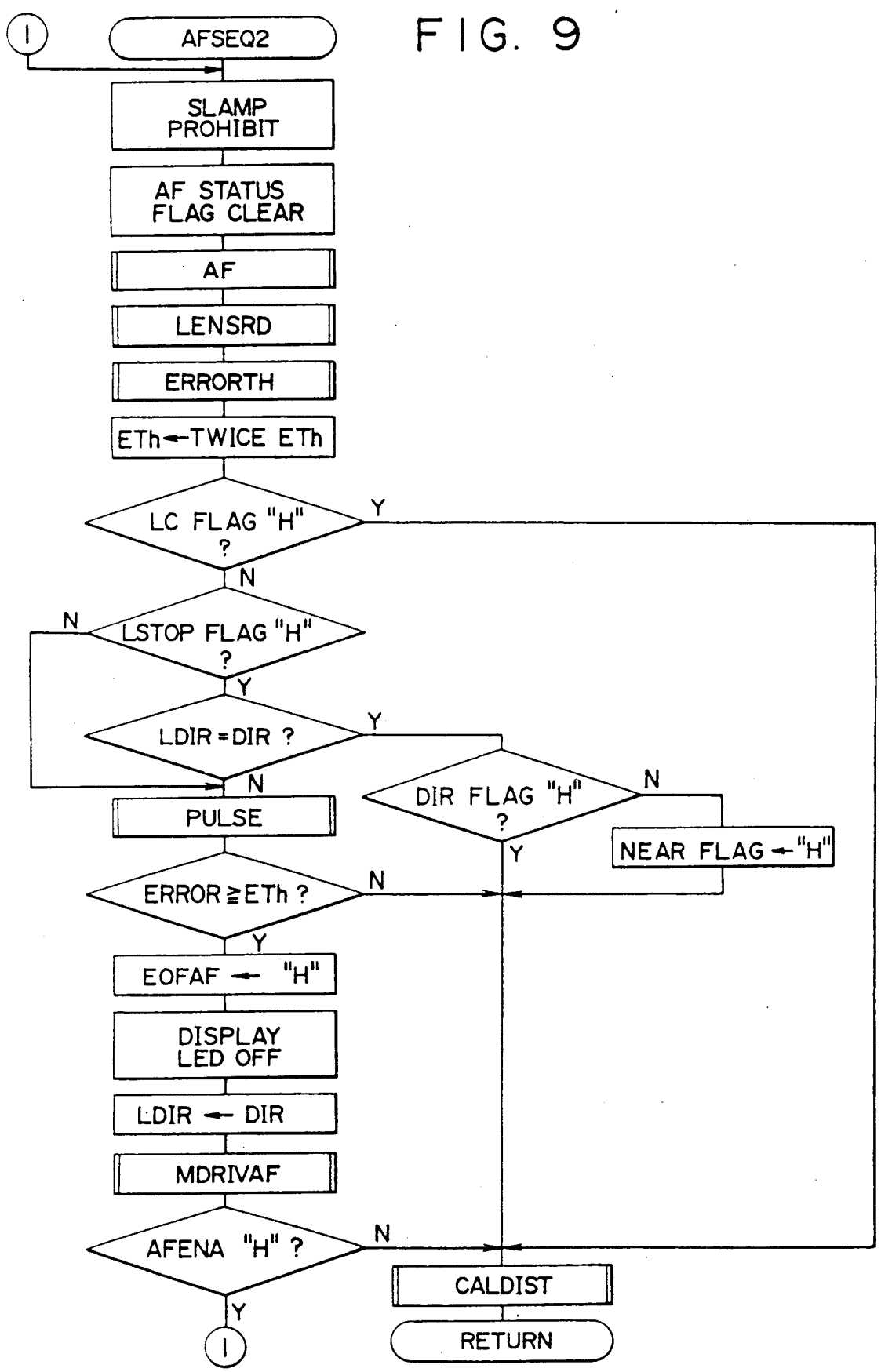

In the mode flow <AFSEQ> shown in FIG. 8, program operations in a subroutine <AFSEQ2> are effected as shown in FIG. 9.

In the AFSEQ mode, in order not to light the S lamp 27a in the range measurement after an EOFAF signal is set to "L", the use of the lamp 27a is prohibited in the first place of the routine <AFSEQ2> and then an AF status flag is cleared. Subsequently, in a routine <AF>, an AF calculated range output (ERROR) is calculated and a direction of lens movement is set in a DIR flag. At this time, as described above, the lamp 27a is not lighted even when an object being photographed is in low brightness.

Subsequently, in a routine <LENSRD>, data for individual lenses stored in the lens data circuit 18 are read in and then an AF accuracy threshold (ETh) is determined in a routine <ERRORTH>. Next, the AF accuracy threshold is doubled. This is because a shutter releasing is not prohibited by moving a taking lens when an object being photographed slightly moves in an extent of twice the AF accuracy threshold (ETh) since in the mode <AFSEQ> focusing has been already achieved in the routine <AFSIN2>.

Next, judging an LC flag, when it is "H" (a range measuring is unable due to a low contrast) operation goes to <CALDIST> without driving the taking lens. When the LC flag is "L", operation goes to an LSTOP flag check. When the LSTOP flag is "H", that is, the taking lens reaches the infinity end or the close range end, an LDIR flag indicating a direction where the lens reaches the end is compared with a DIR flag indicating a direction where the lens is to be moved in the future. When these directions are not the same, operation goes to a routine <PULSE> and when the same, operation goes to the DIR flag check. Thereupon, when the DIR flag is "H", a lens moving direction indicates a farther infinity side than the lens infinity end, so that considering it to be in-focus, operation goes to <CALDIST>. When the DIR flag is "L", this indicates that the object is nearer than the lens infinity end, so that considering it to be out-of-focus, operation goes to <CALDIST> after turning an N flag to "H".

Returning back, the LSTOP flag is not "H", after the number of target moving pulses is calculated, in the routine <PULSE>, comparing the above mentioned AF calculated range output (ERROR) with twice the AF accuracy threshold (ETh), when not ERROR≧ETh, considering it to be in-focus the routine <CALDIST> is effected and then operation goes to RETURN. When ERROR≧ETh, an out-of-focus condition is informed to the main CPU 14 by turning an EOFAF signal "H". Subsequently, the focusing OK display LED 24a and the focusing unable display LED 24b are turned off and contents in the DIR flag indicating a lens moving direction is transferred to an LDIR flag indicating the last lens moving direction. Subsequently, a routine <MDRIVAF> is called and the lens is moved in a direction indicated by the DIR flag by the number of pulses calculated in the routine <PULSE>. When operation returns from the routine <MDRIVAF>, an AFENA signal is first checked and when it is "H", operation returns to ① to repeat the same operation. When the signal is not "H", <CALDIST> is effected and then operation goes to RETURN.

In the routine <AFSEQ2>, such special operations in the routine <AFSIN2> in the foregoing that when the second AF threshold is met, that is, the present and the last driving direction flags DIR and LDIR are the same and the AF calculated output value ERROR is less than twice the AF accuracy threshold (ETh), operation is shifted to an open-loop control to complete the routine <AFSEQ2>, are not effected. This is because the AF accuracy threshold is replaced by the doubled one in a step of (ETh←twice ETh) in the routine <AFSEQ2>, so that a stable motion can be expected in the AF control and in the half-depressed condition of a shutter release the routine <AFSEQ2> is continuously repeated, which is the AF control is carried out always with feed-back. Accordingly, the need of improving a focusing speed by shifting to an open-loop control is not keenly felt. Even if an operation flow in the routine <AFSIN2> is shifted to an open-loop operation to improve the focusing speed, this would be useful only when the last and the present driving direction flags LDIR and DIR are the same and an object being photographed moves a little in the AF operations when the final releasing is effected (turning the second stage of shutter releasing on), which extent in usefulness is to reduce the number of AF operations only by one.

A method for calculating an absolute range will be described hereinafter.

The number of pulses (address signal) corresponding to lens movement from the lens infinity position is set into the absolute range counter, so that it is possible to obtain an absolute range by calculation when the lens movement can be approximated as a linear function. Assuming that a lens movement (in the absolute range counter) is Y and an absolute range is X, the relation between X and Y is approximated as shown in (1):

$$Y = b/(X-a) \ldots \quad (1)$$

where a and b are absolute range factors peculiar to a lens.

Accordingly, when a and b are determined for individual lenses and stored as information in the lens data circuit 18, it is possible to determine an absolute range from a lens movement. Thus, when the auxiliary illumination light is most effective at a position where a taking lens is at a position of X m, it is possible to calculate an amount of movement of the taking lens to an object position by the equation (1).

In the foregoing embodiments, when an object being photographed is in low brightness a range is measured by illuminating once with the auxiliary illuminating light at a position where a taking lens is stopping. However, when it is impossible to measure a range, a taking lens is moved to a position where the auxiliary illumination light is most effective. Nevertheless, when it is still impossible to measure a range with certainty in a first range measurement, for example, the case where the lens is out of place to excess from the effective position of the auxiliary illumination light, it will be understood that the lens may be directly moved to the most effective position of the auxiliary illumination light without measuring a range with the auxiliary light at a position where the lens is stopping.

What is claimed is:

1. An automatic focusing camera with a taking lens having means for detecting an amount and a direction of difference between an image forming position of light from an object being photographed and a film surface and means for driving said taking lens in response to the detected outputs, further comprising:
    memory means for storing a given value for determining an in-focus condition;
    means for generating a standard value for detecting the neighborhood of focus in accordance with said given value from said memory means which standard value is greater than said given value; and
    focusing control means coupled to said driving means for preventing the next driving of the taking lens and including means coupled to said detecting means to halt remeasuring of said amount of difference when the amount of said difference is less than said standard value.

2. An automatic focusing camera according to claim 1 wherein said given value is a function of the lens characteristics of the taking lens, wherein data representative of said lens characteristics is stored in said memory means.

3. An automatic focusing camera as defined in claim 1 further including means for determining the previous and present focusing directions and means for halting further measurement of the object distance when the previous and present focusing directions are the same and the difference amount is less than said standard value.

4. An automatic focusing camera according to claim 3 wherein said standard value is twice the magnitude of said given value.

5. An automatic focusing camera according to claim 3 wherein said standard value is greater in magnitude than said given value.

6. A method for operating an automatic focusing camera having an adjustable taking lens for focusing an image upon a film surface in the camera comprising the steps of:
    (a) detecting the amount and direction of difference between an image forming position of the light from an object being photographed and the film surface;
    (b) moving the taking lens responsive to the amount of difference and the direction of difference determined during step (a);
    (c) repeating step (a);
    (d) determining a given threshold value based upon the characteristics of the taking lens provided in the camera;
    (e) comparing the difference value with the detected difference determined during step (c); and
    (f) halting further focusing of the taking lens when the detected value is less than the threshold value.

7. The method of claim 6 further including the step of determining the previous and present focusing directions and repeating steps (d) through (f) if the previous and present focusing directions are the same.

8. The method of claim 7 further comprising the steps of:
(g) repeating steps (a) through (c) when the difference value is greater than the threshold value.

9. The method of claim 8 further comprising the steps of:
(h) determining a standard value from said given value which standard value differs from said given value;
(i) comparing the last difference value obtained with said standard value and halting the focusing operation when the amount of the last difference value obtained is less than the standard value.

10. The method of claim 9 wherein the standard value is greater than the difference value.

11. The method of claim 9 wherein the standard value is twice the magnitude of the given value.

12. An automatic focusing camera with a taking lens having means for detecting an amount and a direction of difference between an image forming position of light from an object being photographed and a film surface and means for driving said taking lens in response to the detected outputs, further comprising:
memory means for storing a given value for determining an infocus condition;
means for generating a standard value for detecting the neighborhood of focus in accordance with said given value stored in said memory means, which standard value is greater than said given value and is likewise stored in said memory means;
means for determining a direction of difference for comparing a direction of difference last measured by said measuring means with that presently measured after the lens has been driven in response to the last measured output;
focusing control means coupled to said driving means for preventing further driving of the taking lens and including means coupled to said detecting means to halt further measurement of said amount of difference and said direction of difference when the amount of said difference is less than said standard value; and
said focus control means further including means coupled to said detecting means to halt remeasuring of said amount of difference and said direction of distance when the amount of said difference is less than said given value.

13. A method for operating an automatic focusing camera having an adjustable taking lens for focusing an image upon a film surface in the camera comprising the steps of:
(a) detecting the amount and direction of difference between an image forming position of the light from an object being photographed and the film surface;
(b) moving the taking lens responsive to the amount of difference and the direction of difference determined during step (a);
(c) repeating step (a);
(d) determining the given threshold value based upon the characteristics of the taking lens provided in the camera;
(e) determining a standard threshold value based upon said given threshold value wherein said standard threshold value is greater than said given threshold value;
(f) halting further focusing of the taking lens when one of two conditions is present, said first condition being that said difference value is less than said given value regardless of whether the direction of difference measured is different from the last moved direction and said second condition being that said difference value is less than said standard value and the direction of difference measured is the same as the last direction moved.

* * * * *

UNITED STATES PATENT AND TRADEMARK OFFICE
CERTIFICATE OF CORRECTION

PATENT NO.  : 5,030,981

DATED       : July 9, 1991

INVENTOR(S) : Matsuzaki, et. al.

It is certified that error appears in the above-identified patent and that said Letters Patent is hereby corrected as shown below:

Column 1, line 29, change "the" to --a--

Column 1, line 30, change "a" to --the--

Column 4, line 52, change "pulses movement" to
    --movement pulses--

Column 6, line 36, change "and" to --an--

Signed and Sealed this

Twenty-third Day of February, 1993

Attest:

STEPHEN G. KUNIN

Attesting Officer

Acting Commissioner of Patents and Trademarks